US008966592B1

(12) United States Patent
Kates et al.

(10) Patent No.: US 8,966,592 B1
(45) Date of Patent: *Feb. 24, 2015

(54) AUTHENTICATING ACCESS TO A PRIVATE ACCOUNT AT A PUBLIC COMPUTING DEVICE

(71) Applicant: Google Inc., Mountain View, CA (US)

(72) Inventors: Sheridan Kates, New York, NY (US); Arnaud Sahuguet, New York, NY (US); Amir Menachem Mané, Lincroft, NJ (US); Jeremy Brand Sussman, Bedford Hills, NY (US); Aaron Baeten Brown, Croton on Hudson, NY (US); Travis Harrison Kroll Green, Washington, DC (US)

(73) Assignee: Google Inc., Mountain View, CA (US)

( * ) Notice: Subject to any disclaimer, the term of this patent is extended or adjusted under 35 U.S.C. 154(b) by 102 days.

This patent is subject to a terminal disclaimer.

(21) Appl. No.: 13/782,465

(22) Filed: Mar. 1, 2013

Related U.S. Application Data

(63) Continuation of application No. 13/487,911, filed on Jun. 4, 2012, now Pat. No. 8,392,971.

(51) Int. Cl.
*H04L 29/06* (2006.01)
*G06F 7/04* (2006.01)

(52) U.S. Cl.
CPC .................... *H04L 63/08* (2013.01)
USPC ............ 726/4; 726/5; 726/6; 726/7; 713/168; 713/169; 713/170; 713/171; 713/172

(58) Field of Classification Search
USPC .......................................................... 726/4
See application file for complete search history.

(56) References Cited

U.S. PATENT DOCUMENTS

| 7,606,560 | B2 | 10/2009 | Labrou et al. |
| 2008/0016368 | A1 | 1/2008 | Adams |
| 2008/0184339 | A1* | 7/2008 | Shewchuk et al. ................. 726/3 |
| 2010/0161664 | A1 | 6/2010 | Puhl |
| 2010/0215187 | A1* | 8/2010 | Moosavi et al. ................. 381/82 |
| 2012/0019361 | A1 | 1/2012 | Ben Ayed |

FOREIGN PATENT DOCUMENTS

| EP | 2375688 A1 | 10/2011 |
| WO | 2012040198 A1 | 3/2012 |

OTHER PUBLICATIONS

European Search Report issued Jan. 2, 2014 in corresponding European Application No. 13 17 0483.5.

* cited by examiner

*Primary Examiner* — Longbit Chai
(74) *Attorney, Agent, or Firm* — Morris & Kamlay LLP

(57) ABSTRACT

A computer-implemented technique is presented. The technique can include selectively initiating, at a mobile computing device including one or more processors, communication between the mobile computing device and a public computing device. The technique can include transmitting, from the mobile computing device, authentication information to the public computing device. The authentication information can indicate access privileges to a private account associated with a user of the mobile computing device. The technique can include receiving, at the mobile computing device, an access inquiry from the public computing device. The access inquiry can indicate an inquiry as to whether the user wishes to login to the private account at the public computing device. The technique can also include transmitting, from the mobile computing device, an access response to the public computing device. The access response can cause the public computing device to provide the user with access to the private account.

20 Claims, 5 Drawing Sheets

AUTHENTICATING ACCESS TO A PRIVATE ACCOUNT AT A PUBLIC COMPUTING DEVICE

CROSS-REFERENCE TO RELATED APPLICATIONS

This application is a continuation of U.S. patent application Ser. No. 13/487,911, filed Jun. 4, 2012. The entire disclosure of the above application is incorporated herein by reference.

FIELD

The present disclosure relates to user authentication and, more particularly, to techniques for authenticating access to a private account at a public computing device using a user's mobile computing device.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A computing device can include a user interface and one or more processors. For example, a computing device may be a desktop computer. Computing devices may also include mobile computing devices such as mobile phones, tablet computers, and the like. Computing devices may be further divided into public computing devices and personal (or private) computing devices. Public computing devices, e.g., public desktop computers, may be accessed by a plurality of different users. For example, public computing devices may be located in a public room of an office building or in an Internet café. Personal computing devices, on the other hand, are typically not accessible by more than one user. For example, personal computing devices may include mobile computing devices, which are typically in possession of the user (in a hand, in a pocket, in a bag, etc.).

SUMMARY

A computer-implemented technique is presented. The technique can include receiving, at a mobile computing device including one or more processors, an access request from a user. The access request can indicate a request to access a private account associated with the user at a public computing device. The technique can include initiating, at the mobile computing device, communication between the mobile computing device and the public computing device in response to receiving the access request from the user. The technique can include transmitting, from the mobile computing device, authentication information to the public computing device. The authentication information can indicate access privileges to the private account associated with the user. The technique can include receiving, at the mobile computing device, an access inquiry from the public computing device. The access inquiry can indicate an inquiry as to whether the user wishes to login to the private account at the public computing device. The technique can include receiving, at the mobile computing device, an access response from the user at the mobile computing device. The access response indicating whether the user wishes to login to the private account at the public computing device. The technique can also include transmitting, from the mobile computing device, the access response to the public computing device. The access response can selectively cause the public computing device to provide the user with access to the private account.

Another computing-implemented technique is also presented. The technique can include selectively initiating, at a mobile computing device including one or more processors, communication between the mobile computing device and a public computing device. The technique can include transmitting, from the mobile computing device, authentication information to the public computing device, the authentication information indicating access privileges to a private account associated with a user of the mobile computing device. The technique can include receiving, at the mobile computing device, an access inquiry from the public computing device. The access inquiry can indicate an inquiry as to whether the user wishes to login to the private account at the public computing device. The technique can also include transmitting, from the mobile computing device, an access response to the public computing device. The access response can selectively cause the public computing device to provide the user with access to the private account.

In some embodiments, the technique can include receiving, at the mobile computing device, an action by the user. The action can cause the mobile computing device to initiate communication with the public computing device.

In other embodiments, the action by the user can include selecting of a command that causes the mobile computing device to initiate communication with the public computing device.

In some embodiments, the action by the user can include powering on the mobile computing device or initializing an application executable by the mobile computing device.

In other embodiments, the authentication information can indicate whether the mobile computing device is logged into the private account associated with the user.

In some embodiments, the private account can provide the user with features unavailable to unauthorized users of the public computing device.

In other embodiments, the features unavailable to unauthorized users can include additional control functions of at least one of the public computing device and other devices connected to the public computing device via a network.

In some embodiments, the technique can include providing, at the mobile computing device, the access inquiry to the user via a user interface of the mobile computing device, and receiving, at the mobile computing device, the access response from the user via the user interface of the mobile computing device.

In other embodiments, initiating communication between the mobile computing device and the public computing device can include performing WiFi triangulation to determine whether the public computing device is within a predetermined distance from the mobile computing device.

In some embodiments, initiating communication between the mobile computing device and the public computing device can include pairing the mobile computing device with the public computing device according to the Bluetooth protocol.

A mobile computing device is also presented. The mobile computing device can include a communication device and one or more processors. The communication device can be configured to a transmit authentication information to a public computing device. The authentication information can indicate access privileges to a private account associated with a user of the mobile computing device. The communication device can also be configured to receive an access inquiry from the public computing device. The access inquiry can indicate an inquiry as to whether the user wishes to login to the private account at the public computing device. The communication device can also be configured to transmit an access response to the public computing device. The access response can selectively cause the public computing device to provide the user with access to the private account. The one or more processors can be configured to selectively initiate and control communication between the mobile computing device and the public computing device via the communication device.

In some embodiments, the mobile computing device can include a user interface configured to receive an action by the user. The action can cause the one or more processors to initiate communication with the public computing device via the communication device.

In other embodiments, the action by the user can include one of (i) selecting a command via the user interface, (ii) powering on the mobile computing device via the user interface, and (iii) initializing an application executable by the mobile computing device via the user interface.

In some embodiments, the user interface can be further configured to provide the access inquiry to the user and receive the access response from the user.

In other embodiments, the authentication information can indicate whether the mobile computing device is logged into the private account associated with the user.

In some embodiments, the private account can provide the user with features unavailable to unauthorized users of the public computing device.

In other embodiments, the features unavailable to unauthorized users can include additional control functions of at least one of the public computing device and other devices connected to the public computing device via a network.

In some embodiments, the one or more processors can be configured to initiate communication between the mobile computing device and the public computing device via the communication device by performing WiFi triangulation to determine whether the public computing device is within a predetermined distance from the mobile computing device.

In other embodiments, the one or more processors can be configured to initiate communication between the mobile computing device and the public computing device via the communication device by pairing the mobile computing device with the public computing device according to the Bluetooth protocol.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
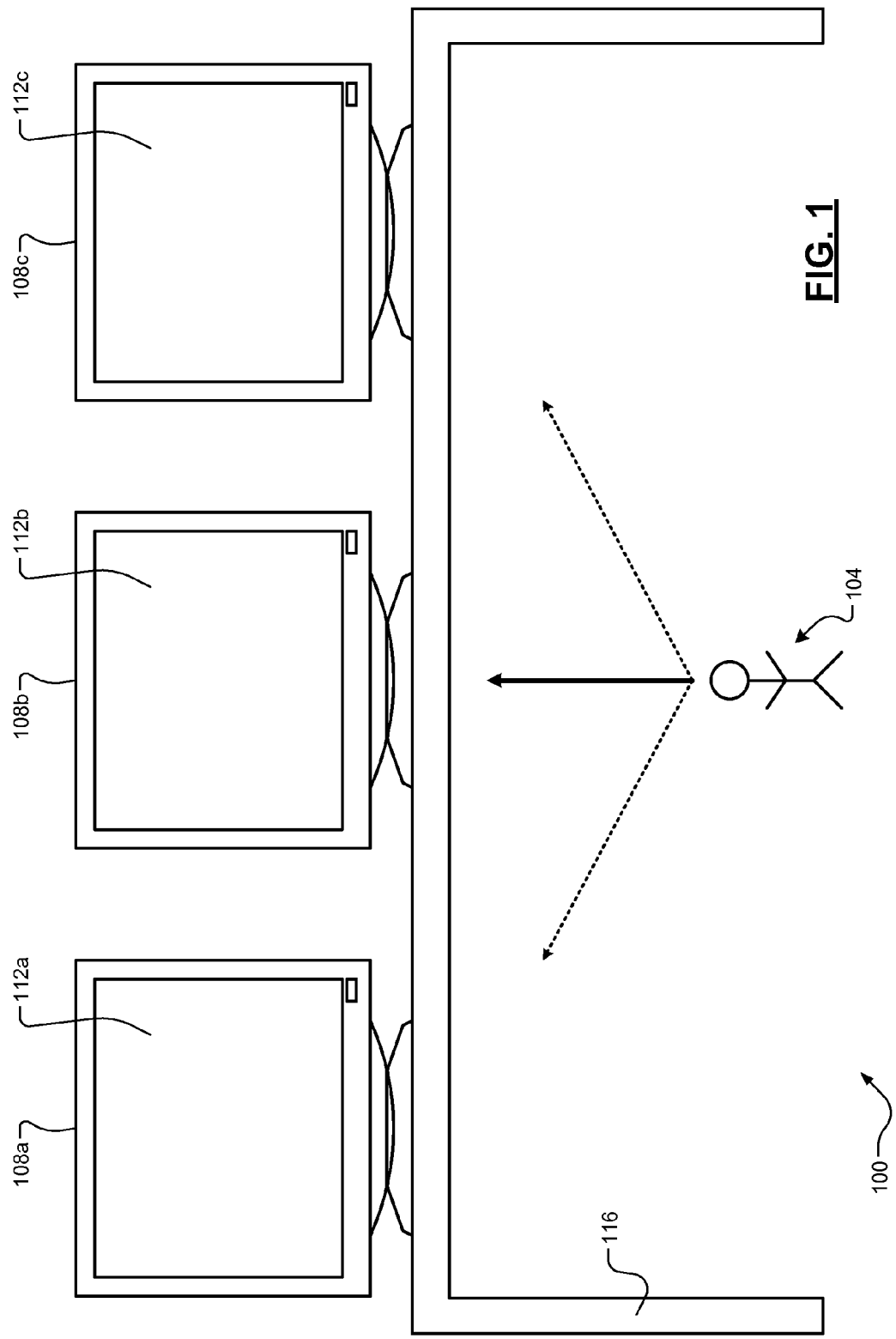
FIG. 1 is a schematic illustration of a user's interaction with one or more public computing devices according to some implementations of the present disclosure.

Referring now to FIG. 1, a schematic illustration 100 of interaction between a user 104 and one or more of a plurality of public computing devices 108a, 108b, and 108c (collectively public computing devices 108) is shown. The public computing devices 108 may be located in close proximity to each other. For example, each of the public computing devices 108 may be located on a common table 116 as shown. For example only, the public computing devices 108 may be found in public locations such as a public room of an office building, an Internet café, or the like. As shown, the user 104 may choose to physically interact with or operate one of the public computing devices 108, e.g., public computing device 108b. While the public computing devices 108 are shown in and described in regards to public areas and access by the public, the public computing devices 108 may also include other suitable computing devices, e.g., a personal computer in a home of the user 104. The public computing devices 108 include respective displays 112a, 112b, and 112c (collectively referred to as displays 112). For example, the displays 112 may be touch displays, such as capacitive sensing displays.

As shown, the user 104 may also see the other public computing devices, e.g., displays 112a and 112c of public computing devices 108a and 108c, respectively. For example, the other public computing devices 108a and 108c may be interacted with or operated by other users. The user 104, therefore, may observe the actions of the other users, and vice-versa. For example, these actions may include entering a password via a user interface such as a physical keyboard. Additionally, for example, if the displays 112 are touch displays, e.g., capacitive sensing displays, a virtual keyboard displayed to the user 104 may be larger than a physical keyboard and therefore more visible to other users. Moreover, in the case of the displays 112 being touch displays, the user 104 may type using one hand (or one finger), which results in a slow rate of input thereby making the user's input more discernible to other users.

The actions by the user 104 interacting with or operating one of the public computing devices 108 may not be secure. For example, other users may be able to view the actions of the user 104 to determine sensitive information such as passwords, credit card information, and/or other private information such as addresses, telephone numbers, and the like. Moreover, the public computing devices 108 may have malicious software (malware), e.g., spyware, which may monitor the actions of the user 104. For example, the software may record a browsing history of the user 104, record keystrokes while the user 104 enters a password, credit card information, and/or other private information (described above).

Accordingly, techniques are presented for authenticating access to a private account at a public computing device using a user's mobile computing device. The techniques generally provide for faster and more secure user authentication when the user is using a public computing device. The techniques may be implemented as software, e.g., an application, running on one or both of the public computing device and the mobile computing device. For example, the software may consistently be running on the public computing device, e.g., in the background. The techniques, however, can be initiated by the user at the mobile computing device. The techniques may be operable, however, only when the software is also running on the mobile computing device, e.g., when a command is selected, when the mobile computing device is powered on, or when an application is executed. For example only, the software may be incorporated into an operating system of the public computing device and/or the mobile computing device. Alternatively, the software may also be available from a third party.

The techniques include initiating, at a mobile computing device including one or more processors, communication between the mobile computing device and a public computing device. The communication can be initiated automatically based on one or more conditions being satisfied. For example, the mobile computing device can initiate communication with the public computing device when it is in physical proximity to the public computing device. For example, the mobile computing device may determine that the public computing device is proximate for initiating communication when the public computing device is within a predetermined area or a predetermined distance from the mobile computing device. For example only, the mobile computing device may use Bluetooth communication/paring, WiFi triangulation, or the like, in determining the whether the public computing device is present.

Other conditions to be satisfied can include both of the computing devices being powered on, one or both of the computing devices executing a specific application, etc. Initiating the communication between the mobile computing device and the public computing device can also be in response to an action by a user of the mobile computing device. The action can cause the mobile computing device to initiate the communication with the public computing device. The action can be input by the user at a user interface of the mobile computing device. For example, the input can be a selection of a command. Alternatively, for example, the input can be powering on the mobile computing device or initializing/launching or executing a specific application on the mobile computing device. It should be appreciated that other user actions with respect to the mobile computing device could also initiate the communication, e.g., pointing, waving, or shaking the mobile computing device.

After communication is initiated, the techniques can include transmitting, from the mobile computing device, authentication information to the public computing device. Authentication may generally refer to whether the mobile computing device has privileges associated with a private account. The private account may be a private account for the user or a group of users. For example, the mobile computing device may be authenticated if the mobile computing device is logged into the private account, e.g. via the Internet. For example only, the private account may be the user's work account. Additionally or alternatively, the mobile computing device may be authenticated if the mobile computing device has a predetermined key or password associated with the private account, e.g., stored in memory. For example only, the mobile computing device may store a cookie.

After receiving the authentication information from the mobile computing device, the public computing device can transmit an access inquiry to the mobile computing device. Alternatively, upon receiving the authentication information from the mobile computing device, the public computing device could automatically provide access to the private account, i.e., automatically login. The access inquiry can represent an inquiry as to whether the user wishes to login to the private account at the public computing device. This access to the private account may include access to functions, programs, or other features which are otherwise inaccessible to other users, e.g., administrative privileges. The techniques can include receiving, at the mobile computing device, the access inquiry from the public computing device. The mobile computing device may display the access inquiry to the user, and the user may then input an access response to the mobile computing device, which is then transmitted back to the public computing device. The access response can cause the public computing device to provide the user with access to the private account.

Additionally, the user may input a selection of one of a plurality of public computing devices capable providing access to the private account. For example, the user may select one of a plurality of public computing devices at which the user wishes to login to the private account. If only one public computing device is present, however, that public computing device may be selected automatically and therefore no additional user input may be required. The public computing device may then provide access to the user to the private account based on the access response. Additionally, for example, if no access response is received at the public computing device, e.g., a communication timeout or the user ignoring the access inquiry and/or failing to provide the access response, the public computing device may prohibit the user from accessing the private account at the public computing device.

Figure 2:
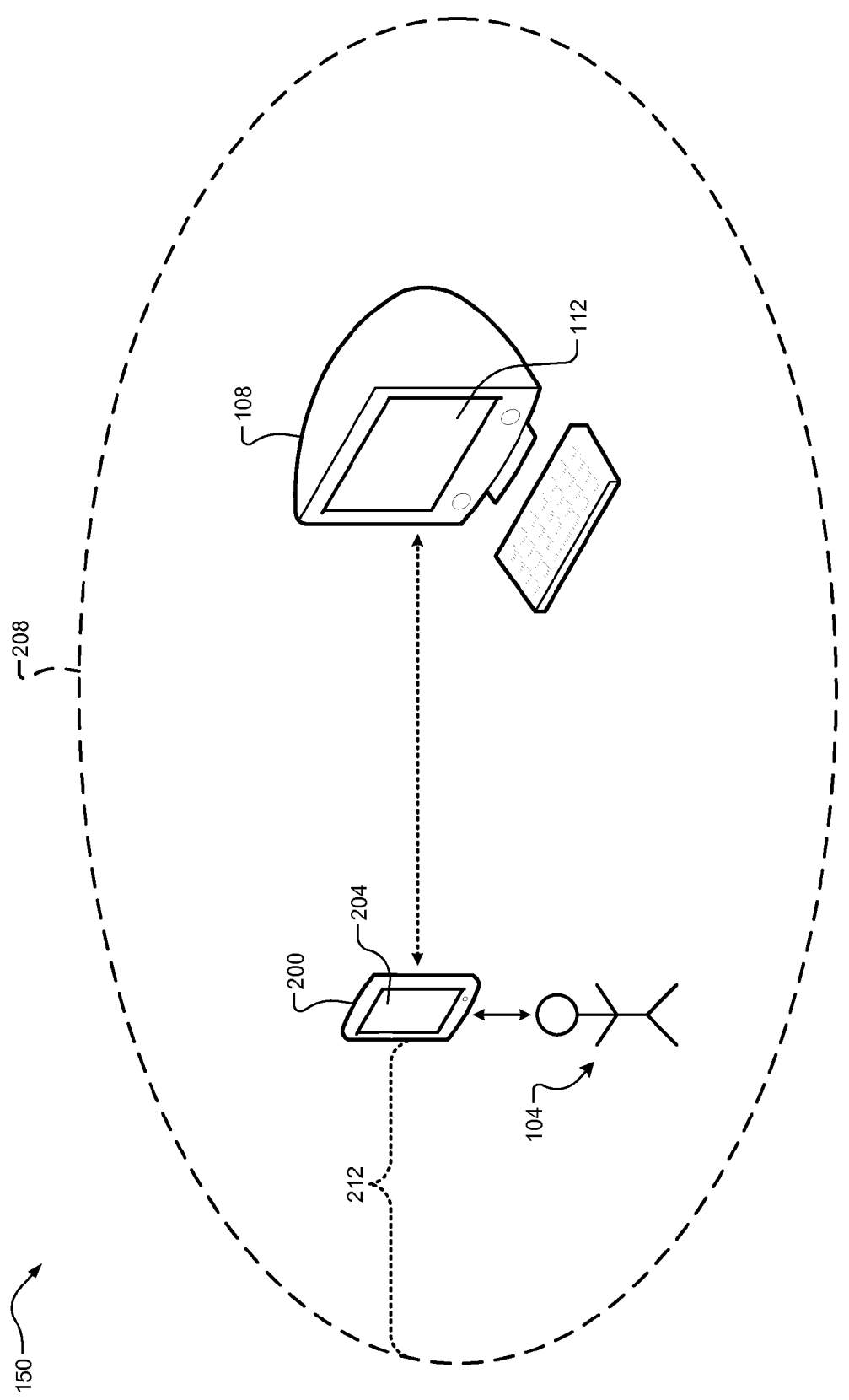
FIG. 2 is a schematic illustration of interaction between a user, an example mobile computing device according to some implementations of the present disclosure, and a public computing device.

Referring now to FIG. 2, a schematic illustration 150 of interaction between one of the public computing devices 108 (hereinafter public computing device 108) and a mobile computing device 200 associated with the user 104 is illustrated. It should be appreciated that while the public computing devices 108 are desktop computers, the public computing devices 108 could also be other computing devices, such as laptop computers. The mobile computing device 200 may be any suitable mobile computing device, such as a mobile phone, a laptop computer, or a tablet computer.

The mobile computing device 200 may include a user interface 204. The user interface 204 can include any components suitable for displaying information to and/or receiving information from the user 104 (described in detail below). The mobile computing device 200 may be carried by the user 104, e.g., in a hand of the user 104, in a clip attached to the user 104, or in a pocket or a bag in possession of the user 104, and therefore may also be referred to as a personal computing device (or a personal mobile computing device).

As previously mentioned, the public computing device 108 may generally be a non-portable computing device such as a desktop computer. For example, the public computing device 108 may be located in a public setting such as a public room in an office building or an Internet café. The mobile computing device 200 may determine whether the public computing device 108 is present before initiating communication. For example, the mobile computing device 200 may determine whether the public computing device 108 is present based on a proximity of the public computing device 108 to the mobile computing device 200.

For example only, the mobile computing device 200 may determine whether the public computing device 108 is present based on whether the public computing device 108 is within a predetermined area 208 around the mobile computing device 200. The predetermined area 208 may be defined by a predetermined distance 212 from the mobile computing device 200. In other words, the mobile computing device 200 may determine whether the public computing device 108 is within the predetermined distance 212 from the mobile computing device 200.

The mobile computing device 200 may determine the proximity of the public computing device 108 using a variety of different techniques, such as Bluetooth communication/pairing and/or Wi-Fi triangulation. For example, the public computing device 108 and the mobile computing device 200 may pair when both devices have automatic Bluetooth pairing enabled. Alternatively, for example, the public computing device 108 and the mobile computing device 200 may be permanently paired together and therefore may automatically initialize the communication between each other when proximate to each other.

As previously described, the mobile computing device 200 may further include software that executes the determination of the proximity of the public computing device 108. For example, when the software is running on the mobile computing device 200, the mobile computing device 200 may continually or intermittently attempt to determine the proximity of the public computing device 108. The software can also be used to provide the authentication information to the public computing device 108, to provide the access inquiry from the public computing device 108 to the user 104, and/or to provide the access response from the user 104 to the public computing device 108.

The public computing device 108 can also be executing software in order to establish communication with the mobile computing device 200, to authenticate the mobile computing device 200, to provide the access inquiry to the mobile computing device 200, and/or to receive the access response from the mobile computing device 200 causing access to the private account to be provided to the user 104. While one public computing device 108 and one mobile computing device 200 are shown, the techniques disclosed herein can be applied to a plurality of public computing devices and/or a plurality of mobile devices.

Figure 3:
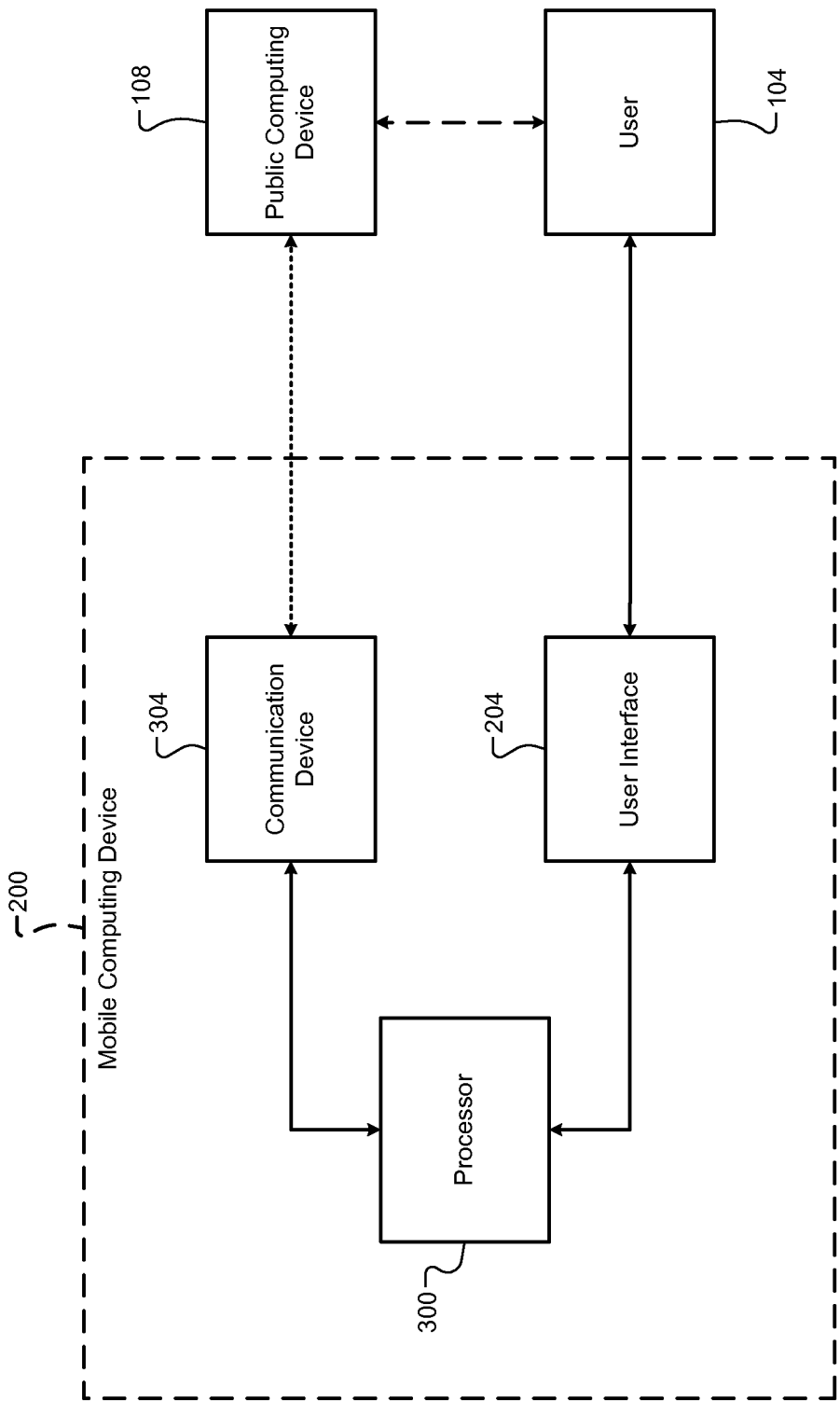
FIG. 3 is a functional block diagram of the example mobile computing device of FIG. 2.

Referring now to FIG. 3, an example of the mobile computing device 200 is illustrated. The mobile computing device 200 may include the user interface 204, a processor 300, and a communication device 304. It should be appreciated that the mobile computing device 200 can also include other suitable components, such as memory. It should also be appreciated that while one processor 300 is show, the mobile computing device 200 can include two or more processors operating in a parallel or distributed architecture. Further, the one or more processors can wholly or partially execute the software discussed throughout the present disclosure.

As previously described, the user interface 204 can be configured to handle interaction between the user 104 and the mobile computing device 200. In other words, the user interface 204 can control various communications between the mobile computing device 200 and the user 104. The user interface 204 may include one or more components that enable the user to input information to the mobile computing device 200. For example, the user interface 204 can include a touch display that can display information to and receive input from the user 104. The user interface 204 could also include a physical keyboard, one or more buttons, a speaker, a microphone, and/or a vibrator.

The processor 300 can control operation of the mobile computing device 200. The processor 300, therefore, may communicate with both the user interface 204 and the communication device 304. For example, the processor 300 may perform tasks such as, but not limited to, loading/controlling the operating system of the mobile computing device 200, loading/configuring communication parameters for the communication device 304, executing the software associated with some of the techniques of the present disclosure, and controlling memory storage/retrieval operations, e.g., for loading of various parameters.

In particular, the processor 300 can execute the techniques of the present disclosure. More specifically, the processor 300 can control the determination of whether the public computing device 108 is present, the provision of the access information to the public computing device 108 (via the communication device 304), the receipt and presentation of the access inquiry from the public computing device 108 (via the communication device 304) when the mobile computing device 200 is authenticated, and/or the receipt and provision of the access response to the public computing device 108 (via the communication device 304).

The communication device 304 can control communication between the mobile computing device 200 and other devices—in particular, the public computing device 108. The communication device 304 can include any suitable communication components, such as a transceiver. It should be appreciated, however, that the communication device 304 can also include other components. The communication device 304 can also provide for communication between the mobile computing device 200 and a network, such as the Internet. For example, the communication device 304 may be configured for both wired and wireless network connections, e.g., radio frequency (RF) communication.

Specifically, the communication device 304 may communicate with (or attempt to communicate with) the public computing device 108 when the mobile computing device 200 is determining whether the public computing device 108 is present. As previously described, the communication device 304 may utilize Bluetooth communication/pairing, Wi-Fi triangulation, or the like in determining whether the public computing device 108 is present. The communication device 304 can also transmit the authentication information and/or the access response to the public computing device 108. Similarly, the communication device 304 can also receive the access inquiry from the public computing device 108.

Figure 4:
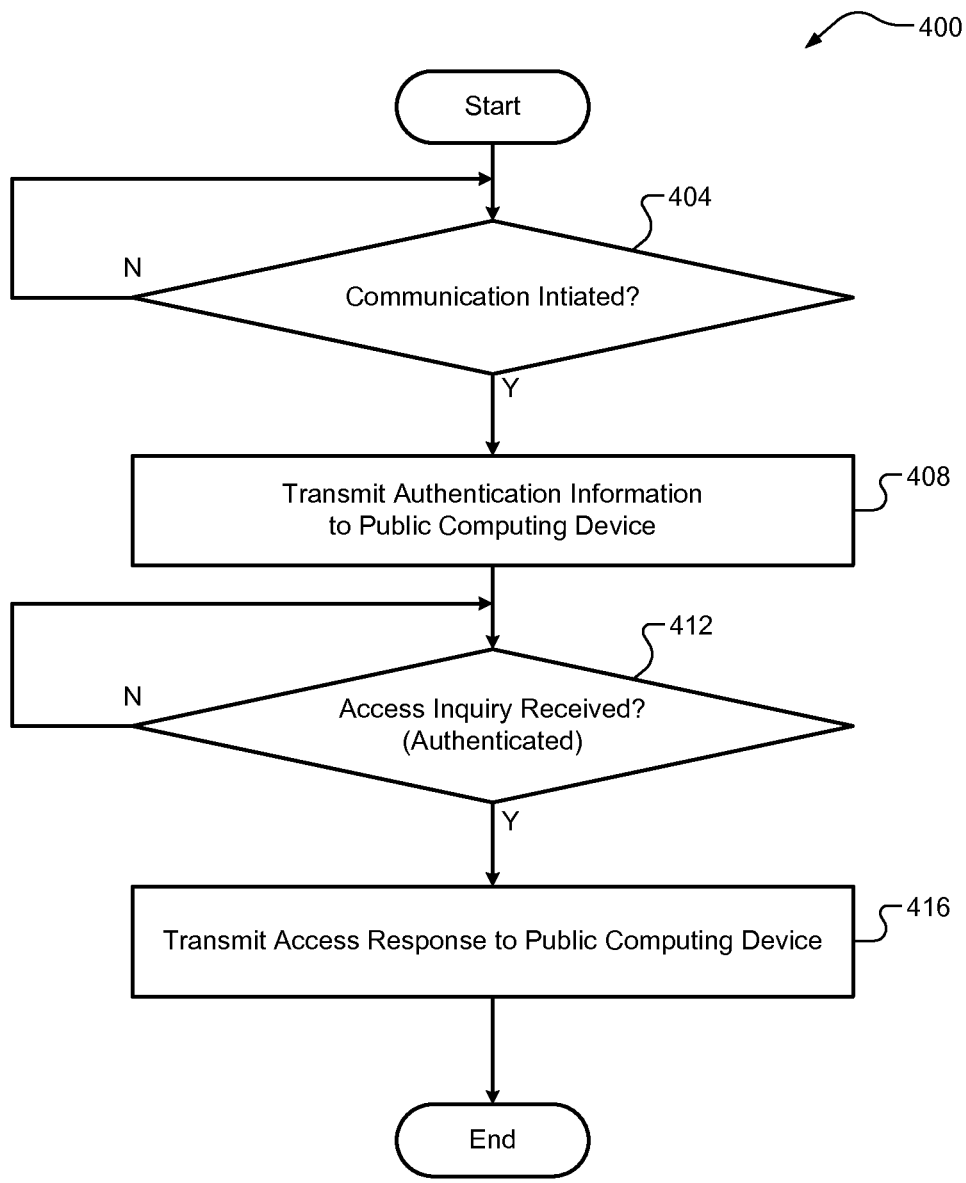
FIG. 4 is flow diagram of an example technique for authenticating access to a private account at a public computing device using a user's mobile computing device according to some implementations of the present disclosure.

Referring now to FIG. 4, an example technique 400 for authenticating user access to a private account at a public computing device using a user's mobile computing device is illustrated. The technique 400 begins at 404.

At 404, the mobile computing device 200 can selectively initiate communication between the mobile computing device 200 and the public computing device 108. Rather, the mobile computing device 200 can determine whether to initiate communication between the mobile computing device 200 and the public computing device 108. The initiation of communication by the mobile computing device 200 can be based on various factors, such as proximity to the public computing device 108 and/or various actions taken by the user 104. If communication is initiated, the technique can proceed to 408. If communication is not initiated, the technique can end or return to 404 for one or more additional cycles.

At 408, the mobile computing device 200 can transmit authentication information to the public computing device 108. The authentication information can indicate access privileges to a private account associated with the user 104 of the mobile computing device 200, e.g., a login identifier and a password. At 412, the mobile computing device 200 can determine whether the access inquiry has been received from the public computing device 108 in response to authentication of the authentication information. The access inquiry can indicate an inquiry as to whether the user 104 wishes to access the private account at the public computing device 108. If the access inquiry has been received, the technique can proceed to 416. If the access inquiry has not been received, the technique can end, e.g., after a timeout, or return to 412 for one or more additional cycles.

At 416, the mobile computing device 200 can transmit the access response from the user 104 to the public computing device 108. For example, the user 104 can input the access response at the user interface 204 of the mobile computing device 200. The access response can selectively cause the public computing device to provide the user 104 with access to the private account. Rather, if the access response indicates that the user 104 wishes to access the private account, then the public computing device 108 can provide the user 104 with the access privileges. The technique 400 can then end or return to 404 for one or more additional cycles.

Figure 5:
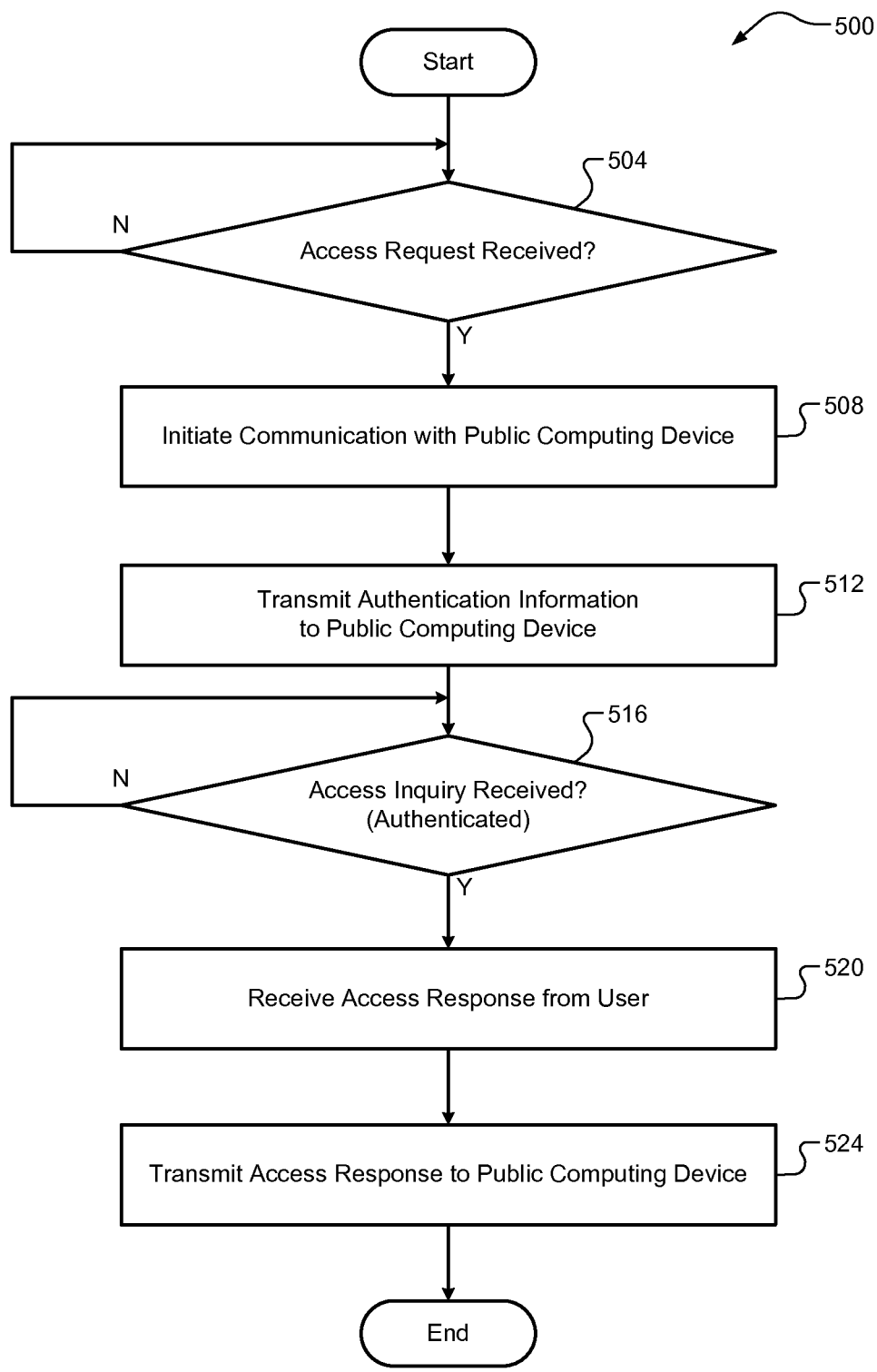
FIG. 5 is a flow diagram of another example technique for authenticating access to a private account at a public computing device using a user's mobile computing device according to some implementations of the present disclosure.

Referring now to FIG. 5, another example technique 500 for authenticating access to a private account at a public computing device using a user's mobile computing device is illustrated. The technique 500 begins at 504.

At 504, the mobile computing device 200 can determine whether an access request has been received from the user 104. The access request can indicate a request to access the private account associated with the user 104 at the public computing device 108. For example, the access request can be in response to an action by the user 104. If the access request has been received, the technique 500 can proceed to 508. If the access request has not been received, the technique 500 can end or return to 504 for one or more additional cycles.

At 508, the mobile computing device 200 can initiate communication between the mobile computing device 200 and the public computing device 108 in response to receiving the access request from the user 104. At 512, the mobile computing device 200 can transmit authentication information to the public computing device 108. The authentication information can indicate access privileges to the private account associated with the user 104. At 516, the mobile computing device 200 can determine whether the access inquiry has been received from the public computing device 108. The access inquiry can indicate an inquiry as to whether the user 104 wishes to login to the private account at the public computing device 108. If the access inquiry has been received, the technique can proceed to 520. If the access inquiry has not been received, the technique can end, e.g., timeout, or return to 516 for one or more additional cycles.

At 520, the mobile computing device 200 can receive the access response from the user 104 at the mobile computing device 200. The access response can indicate whether the user wishes to login to the private account at the public computing device 108. At 524, the mobile computing device 200 can transmit the access response to the public computing device 108. The access response can selectively cause the public computing device 108 to provide the user 104 with access to the private account. Rather, if the access response indicates that the user 104 wishes to access the private account, then the public computing device 108 can provide the user 104 with the access privileges. The technique 500 can then end or return to 504 for one or more additional cycles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code, or a process executed by a distributed network of processors and storage in networked clusters or datacenters; other suitable components that provide the described functionality; or a combination of some or all of the above, such as in a system-on-chip. The term module may include memory (shared, dedicated, or group) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
receiving, at a public computing device including one or more processors, a request from a mobile computing device to initiate communication with the public computing device, the mobile computing device being separate from the public computing device;
initiating, at the public computing device, communication with the mobile computing device in response to receiving the request from the mobile computing device;
receiving, at the public computing device, authentication information from the mobile computing device, the authentication information indicating access privileges to a private account associated with the user;
transmitting, from the public computing device, an access inquiry to the mobile computing device in response to receiving said authentication information from the mobile computing device, the access inquiry indicating an inquiry as to whether the user wishes to log in to the private account at the public computing device, wherein the access inquiry causes the mobile computing device to obtain an access response from the user, the access response indicating whether the user wishes to log in to the private account at the public computing device;
receiving, at the public computing device, the access response from the mobile computing device; and
selectively providing, at the public computing device, the user with access to the private account based on the access response.

2. A computer-implemented method, comprising:
selectively initiating, at a public computing device including one or more processors, communication with a mobile computing device that is separate from the public computing device in response to an access request from the mobile computing device;
receiving, at the public computing device, authentication information from the mobile computing device, the authentication information indicating access privileges to a private account associated with a user of the mobile computing device;
transmitting, from the public computing device, an access inquiry to the mobile computing device in response to receiving said authentication information from the mobile computing device, the access inquiry indicating an inquiry as to whether the user wishes to log in to the private account at the public computing device, wherein the access inquiry causes the mobile computing device to obtain an access response from the user, the access response indicating whether the user wishes to log in to the private account at the public computing device;
receiving, at the public computing device, the access response from the mobile computing device; and
selectively providing, at the public computing device, the user with access to the private account based on the access response.

3. The computer-implemented method of claim 2, further comprising receiving, at the public computing device, a request from the mobile computing device to initiate communication with the public computing device, wherein initiating, at the public computing device, communication with the mobile computing device is in response to receiving the request.

4. The computer-implemented method of claim 3, wherein initiating, at the public computing device, communication with the mobile computing device is further in response to when software is executing at the public computing device, the software being configured to process communications between the public computing device and the mobile computing device in order to selectively provide the user with access to the private account at the public computing device.

5. The computer-implemented method of claim 4, wherein the software executing at the computing device is automatically launched upon powering on the public computing device or is initialized as an application executable at the public computing device.

6. The computer-implemented method of claim 2, wherein the authentication information indicates whether the mobile computing device is logged into the private account associated with the user.

7. The computer-implemented method of claim 6, wherein the private account provides the user with features unavailable to unauthorized users of the public computing device.

8. The computer-implemented method of claim 7, wherein the features unavailable to unauthorized users include additional control functions of at least one of the public computing device and other devices connected to the public computing device via a network.

9. The computer-implemented method of claim 2, wherein the access inquiry causes the mobile computing device to provide the access inquiry to the user via a user interface of the mobile computing device, and wherein the access response indicates a response from the user via the user interface of the mobile computing device.

10. The computer-implemented method of claim 2, wherein initiating, at the public computing device, communication with the mobile computing device includes performing WiFi triangulation to determine whether the mobile computing device is within a predetermined distance from the public computing device.

11. The computer-implemented method of claim 2, wherein initiating, at the public computing device, communication with the mobile computing device includes pairing the public computing device with the mobile computing device according to the Bluetooth protocol.

12. A public computing device, comprising:
a communication device configured to:
initiate, at the public computing device including one or more processors, communication with a mobile computing device that is separate from the public computing device in response to an access request from the mobile computing device;
receive authentication information from the mobile computing device, the authentication information indicating access privileges to a private account associated with a user of the mobile computing device,
transmit an access inquiry to the mobile computing device in response to receiving said authentication information from the mobile computing device, the access inquiry indicating an inquiry as to whether the user wishes to log in to the private account at the public computing device, wherein the access inquiry causes the mobile computing device to obtain an access response from the user, the access response indicating whether the user wishes to log in to the private account at the public computing device, and
receive the access response from the mobile computing device; and
one or more processors configured to:
selectively initiate and control communication between the public computing device and the mobile computing device via the communication device, and
selectively provide the user with access to the private account based on the access response.

13. The public computing device of claim 12, wherein the communication device is further configured to receive a request from the mobile computing device to initiate communication with the public computing device, wherein the one or more processors are configured to initiate communication between the public computing device and the mobile computing device via the communication device in response to the communication device receiving the request.

14. The public computing device of claim 13, wherein the one or more processors are configured to communication with the mobile computing device via the communication device further in response to when software is executing at the public computing device, the software being configured to process communications between the public computing device and the mobile computing device in order to selectively provide the user with access to the private account at the public computing device, wherein the software executing at the computing device is automatically launched upon powering on the public computing device or is initialized as an application executable at the public computing device.

15. The public computing device of claim 12, wherein the access inquiry causes a user interface of the mobile computing device to display the access inquiry to the user and receive the access response from the user.

16. The public computing device of claim 12, wherein the authentication information indicates whether the mobile computing device is logged into the private account associated with the user.

17. The public computing device of claim 16, wherein the private account provides the user with features unavailable to unauthorized users of the public computing device.

18. The public computing device of claim 17, wherein the features unavailable to unauthorized users include additional control functions of at least one of the public computing device and other devices connected to the public computing device via a network.

19. The public computing device of claim 12, wherein the one or more processors are configured to initiate communication with the mobile computing device via the communication device by performing WiFi triangulation to determine whether the mobile computing device is within a predetermined distance from the public computing device.

20. The public computing device of claim 12, wherein the one or more processors are configured to initiate communication with the mobile computing device via the communication device by pairing the public computing device with the mobile computing device according to the Bluetooth protocol.

* * * * *